Sept. 14, 1937. L. MARX Re. 20,504

TOY PURSUIT CAR

Original Filed Oct. 11, 1935

INVENTOR
Louis Marx
BY
James Franklin
ATTORNEYS

Reissued Sept. 14, 1937

Re. 20,504

UNITED STATES PATENT OFFICE 20,504

TOY PURSUIT CAR

Louis Marx, New York, N. Y.

Original No. 2,055,848, dated September 29, 1936, Serial No. 44,484, October 11, 1935. Application for reissue June 29, 1937, Serial No. 150,981

19 Claims. (Cl. 46—10)

This invention relates to toys, and more particularly to a toy simulating a vehicle the body of which is provided with an opening, and a gun projecting through the opening, the firing of the gun being simulated by the projection of sparks. In the specific example of my invention here illustrated, the vehicle is an automobile, and the opening through which the gun is fired is a windshield opening.

One specific object of my invention is to provide a toy simulating a pursuit car such as is used by police, Federal agents or the like. Another specific object is to provide such a toy with a simulated operator sighting and firing a machine gun from the pursuit car during its operation. Still further objects are to enhance the realism of the toy in operation by producing a shower of sparks at the gun and by producing a succession of percussive sounds, thereby imitating the operation of the gun. Still another object of my invention resides in the provision of a single driving motor for simultaneously propelling the vehicle and operating the sparking and noise-making mechanisms of the gun.

A further object of my invention is to devise a simplified and economical construction for the toy. In this connection I may point out that the gun is necessarily small in dimension if kept within reasonable dimensional proportion to the vehicle. This makes it difficult if not impossible to localize the sparking mechanism directly within the gun body. In accordance with my invention the gun body is made small, but is left open at the bottom, and a spark-producing wheel is located beneath the gun and is substantially concealed by the vehicle body and gun. The flint and friction wheel are so relatively located as to throw a shower of sparks forwardly through the opening in the vehicle body, at the open bottom of the gun.

To the accomplishment of the foregoing and other objects which will hereinafter appear, my invention consists in the toy vehicle and gun and spark-producing elements and their relation one to the other as are hereinafter more particularly described in the specification and sought to be defined in the claims. The specification is accompanied by a drawing in which:

Figure 1:
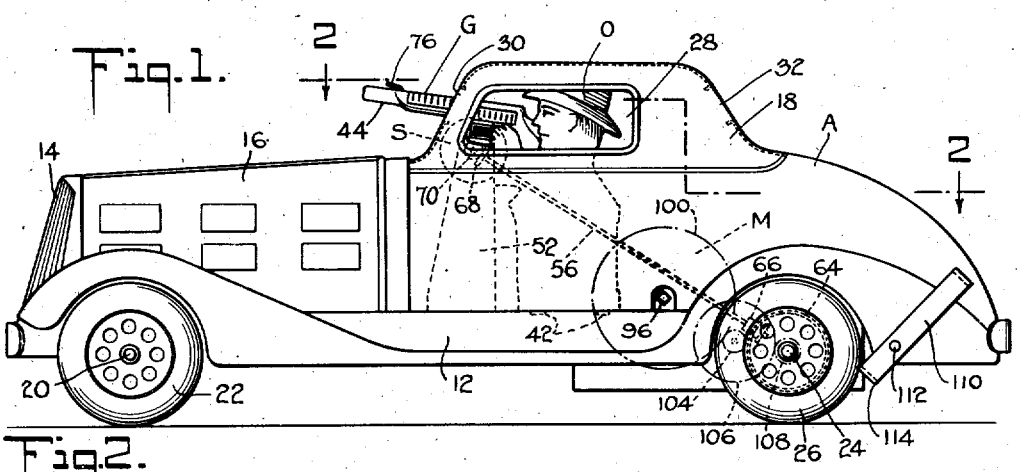
Fig. 1 is a side elevation of a toy embodying features of my invention.

Referring to the drawing, the toy of my invention comprises a simulated vehicle preferably in the form of a toy automobile generally designated A. Within the automobile there is placed the figure of an operator O holding and sighting a machine gun G through the open windshield of the automobile. The firing of the gun is imitated by sparking mechanism generally designated S, the noise-making mechanism generally designated N. The toy is operated by a motor M which preferably drives the automobile, the sparking mechanism and the noise-producing mechanism.

Considering the arrangement in greater detail, the toy automobile is made of sheet metal parts simulating a chassis 12 surmounted by a radiator 14, a hood 16 and a coupé type body 18. The chassis 12 carries a front axle 20 bearing freely rotatable front wheels 22, and a rear axle 24 to which are secured rear or driving wheels 26. The chassis may be fitted with customary front and rear bumpers and mudguards.

The body 18 is cut away at the sides to form side windows 28 and is also cut away at the front to form a windshield opening 30. It may also be cut away at the back to form a rear window opening 32. The operator O holding the gun G may of course be seen through these windows.

Figure 2:
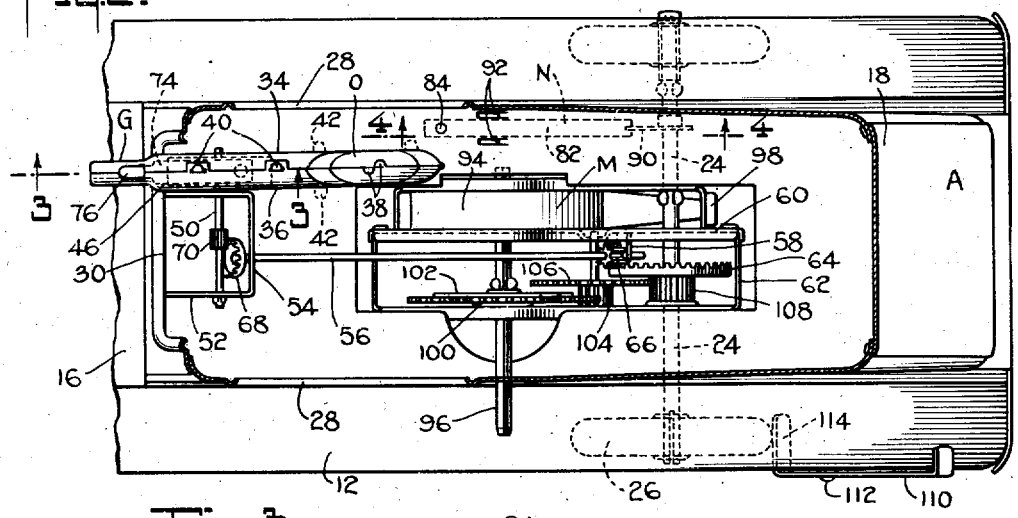
Fig. 2 is a horizontal section taken in the plane of the line 2—2 of Fig. 1.

The operator O and machine gun simulation G are preferably formed integrally in an inexpensive manner by using two oppositely convexed sheet metal sides 34 and 36 (Fig. 2) which are fitted together in edge to edge relation and secured by appropriate connections such as the bent tongue connections 38 and the tongue and slot connections 40 visible in Fig. 2. The configuration of the sheet metal sides is such that the operator appears to hold the machine gun in proper position, and the dimension of the assembly is such that when the bottom of the figure is placed on the floor or chassis plate of the automobile, the barrel of the gun G passes through the windshield opening 30 just above the inwardly flanged lower edge of the windshield opening thereof. The operator is secured to the chassis plate by appropriate tongue and slot connections indicated at 42.

Figure 3:
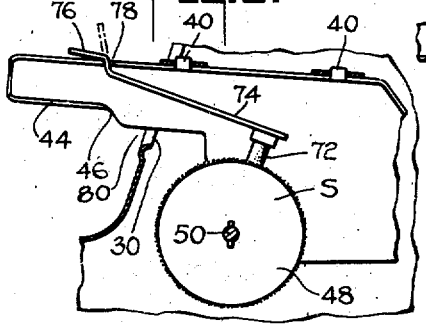
Fig. 3 is an enlarged section taken in the plane of the line 3—3 of Fig. 2.
Figure 4:
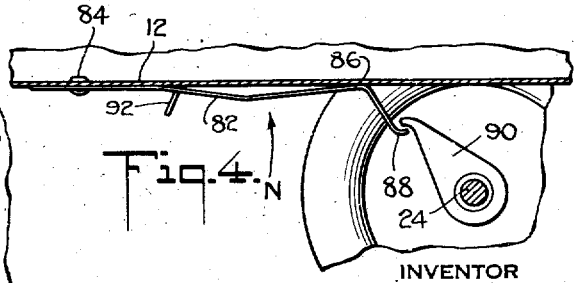
Fig. 4 shows the noise-making mechanism in elevation as viewed at the line 4—4 in Fig. 2.

While the sides 34 and 36 are contiguous at their edges around most of the combined figure, these sides are left straight and open over a substantial portion of the bottom of the gun. In the specific example here illustrated the sides are closed at the muzzle portion 44, but are open beginning at the point 46 (Fig. 3). Beneath and partially housed by the breech portion of the gun is a friction wheel 48 forming part of the sparking mechanism. This wheel is mounted on a shaft 50 journalled in a special frame 52 which extends downwardly to the bottom of the vehicle, where it is secured by appropriate tongue and slot connections. The frame 52 is channel-shaped and the connecting face 54 thereof is preferably disposed rearwardly, thus constituting a forward bearing for a longitudinally disposed downwardly sloping shaft 56. The lower end of shaft 56 is journalled in a bearing lug 58 struck from the side wall 60 of a motor frame 62. The rear axle 24 of the vehicle carries a crown gear 64 meshing with a pinion 66 mounted on shaft 56 which in turn carries at its forward end a crown gear 68 meshing with a pinion 70 mounted on shaft 50. Rotation of axle 24 thus imparts rotation to the sparking wheel S, and the gearing is so arranged that the sparking wheel rotates in a counter-clockwise direction as viewed in the drawing.

The sparking mechanism is completed by a suitable pyrophoric element 72 which for convenience may be referred to as a flint. This element is mounted at the trailing end of a strip of sheet metal 74, the forward end 76 of which is bent upwardly through a slot 78 at the top of the gun and then bent forwardly and downwardly as indicated by the change from the broken line to the solid line position in Fig. 3. Holder 74 is received loosely within the gun body and within slot 78. This permits the same to self-adjustably rest on the friction wheel with a light gravitational contact which on the one hand is adequate to produce a shower of sparks, but on the other hand, does not result in excessive friction or rapid wearing away of the flint. The flint and sparking wheel are so relatively positioned that the resulting shower of sparks is thrown forwardly and upwardly at the open bottom portion of the gun, thus tending to throw the sparks into and through the muzzle of the gun.

It will be understood, however, that any discharge of sparks at or immediately adjacent the muzzle is sufficient to produce the desired illusion, for the toy is for the most part viewed from above. I may also point out that the disposition of the sparking wheel here made is a fortunate one in that the wheel is concealed without necessitating a special housing therefor because of its disposition immediately behind and below the front part 80 of the automobile body immediately below the windshield opening 30. Although the wall 80 taken together with the machine gun body effectively conceals the sparking mechanism, there is no obstruction of the desired shower of sparks. Although the flint wears slowly it may be readily replaced if completely worn out by bending the tip 76 of the flint holder upwardly to the broken line position shown in Fig. 3, whereupon the forward end of the holder may be dropped downwardly through the open bottom portion of the gun and the entire holder drawn forwardly from the gun through the windshield opening. This represents an important additional advantage of using the open bottom construction for the gun, and it is therefore recommended that the open part of the gun be carried forwardly to a point located approximately beneath the slot 78.

The noise-making mechanism N comprises simply a hammer or clatter plate in the form of a leaf spring 82, the forward end of which is riveted beneath the chassis plate 12 by a suitable eyelet 84, while the rear end is bent to form a hammer portion 86 and a cam follower portion 88. The latter cooperates with a suitable cam 90 mounted on the rear axle 24 of the vehicle. A multiple-toothed cam may be employed if preferred. The movement of spring 82 is guided by a pair of tongues 92 struck downwardly from the chassis plate on opposite sides of the spring. When the vehicle is propelled, rotation of the axle causes a clatter or series of percussive sounds which is realistic in accompaniment with the sparking at the muzzle of the gun.

The motor M may be of conventional type and probably requires no detailed description. As here illustrated it comprises a main spring 94, the inner end of which is secured to a square winding stem 96 and the outer end of which is anchored on the motor frame at 98. The end of stem 96 may be bent to form a suitable key, or as here illustrated, may be terminated without a key, but projecting from the side of the vehicle to receive a suitable key, which has been omitted from the drawing. Stem 96 carries a main driving gear 100 which is driven through a suitable clutch or ratcheting device 102. Gear 100 meshes with a pinion 104 which in turn rotates a gear 106 meshing with a pinion 108 fixed on the rear axle 24 of the vehicle. The motor thus serves to drive the vehicle, the sparking mechanism and the noise-making mechanism. A brake 110 is provided to stop the operation of the toy when desired. In the form illustrated, this brake is pivoted on one of the rear mudguards at 112, and is bent inwardly to form the brake shoe 114 movable into engagement with the rubber tread of one of the rear wheels 26. The direction of rotation of the wheel is such as to tend to tighten the brake pressure once the brake has been set.

It is believed that the mode of constructing and using, as well as the many advantages of my toy pursuit car, will be apparent from the foregoing detailed description thereof. The toy is realistic in operation because the normal operating noise augmented by the special noise-making element combines with the spark ejection at the muzzle of the gun to produce an effect which is surprisingly heightened by the mobility and movement of the entire toy during the simulated firing of the gun. The toy is comparatively economical to produce because a single driving motor is used for propelling all of the elements of the toy. The simulation of the operator and gun is simplified by forming both in a single unit made up of only two sheet metal sides, and even these sides may if desired be made of a single piece of sheet metal folded at the back edge of the figure. The gun is properly proportioned to the vehicle, and although this results in necessarily making the gun very small in dimension, it is nevertheless provided with a sparking wheel and flint of full size and these parts are so supported as not to require the use of delicate or miniature parts. Despite this fact the sparking mechanism is substantially concealed, and the flint and flint holder are readily removable for replacement.

The gun is aimed through the front windshield because the toy is simulatedly a pursuit car, but it will be understood that it may be constructed with the gun pointed through a side or rear window instead of through the windshield, and that in this respect the windshield opening is generically a window opening like the side and rear windows.

It will therefore be understood that while I have shown and described my invention in a preferred form, many changes and modifications may be made in the structure disclosed without departing from the spirit of the invention defined in the following claims. In referring therein to the operator as formed of two sides I do not means to exclude the preferred construction here illustrated in which the two sides are folded from a single piece of sheet metal.

I claim:

1. A toy comprising a wheeled toy automobile the body of which is provided with a window opening, a simulated machine gun the barrel of which projects through the window opening, a friction wheel rotatably mounted inside said automobile body beneath and partially housed by the gun, said wheel being so disposed as to be substantially concealed by the automobile and machine gun bodies, a flint engaging said wheel, and means gearing said wheel to the automobile wheels.

2. A toy comprising a wheeled vehicle the body of which is provided with a window opening, a simulated machine gun the barrel of which projects through the window opening, a friction wheel rotatably mounted inside said vehicle body beneath and partially housed by the gun, said wheel being so disposed as to be substantially concealed by the vehicle and machine gun bodies, a flint engaging said wheel, noise-making mechanism including a vibratile noise-making element and a rotatable cam for actuating the same, and a motor geared to the aforesaid friction wheel and cam.

3. A toy simulating a pursuit car used by police, Federal agents or the like, said toy comprising a toy automobile, the body of which is provided with a window opening, a simulated machine gun the barrel of which projects through the window opening, a friction wheel rotatably mounted inside said automobile body beneath and partially housed by the gun, said wheel being so disposed as to be substantially concealed by the automobile and machine gun bodies, a flint engaging said wheel, noise-making mechanism including a vibratile noise-making element and a rotatable cam for actuating the same, and a motor geared to the wheels of the vehicle and to the aforesaid friction wheel and cam.

4. A toy simulating a pursuit car used by police, Federal agents or the like, said toy comprising a toy automobile, the body of which is provided with a windshield opening, a simulated machine gun the barrel of which projects through the windshield opening, said machine gun being formed of sheet metal bent to inverted trough shape and open over a substantial part of the bottom thereof, a friction wheel rotatably mounted inside said automobile body beneath and partially housed by the open portion of the machine gun, said wheel being so disposed as to be substantially concealed by the parts of the automobile and machine gun bodies, a flint carried by a flint holder loosely pivoted through a slot at the top of the machine gun body, said flint holder being so disposed as to throw a shower of sparks forwardly and upwardly along the open bottom portion of the machine gun, and means to drive the aforesaid friction wheel.

5. A toy simulating a pursuit car used by police, Federal agents or the like, said toy comprising a toy automobile, the body of which is provided with a windshield opening, a simulated machine gun the barrel of which projects through the windshield opening, said machine gun being formed of sheet metal bent to inverted trough shape and open over a substantial part of the bottom thereof, a friction wheel rotatably mounted inside said automobile body beneath the open portion of the gun, said wheel being so disposed as to be substantially concealed by the parts of the automobile and machine gun bodies, a flint carried by a flint holder loosely pivoted through a slot at the top of the machine gun body, said flint holder being so disposed as to throw a shower of sparks forwardly and upwardly along the open bottom portion of the machine gun, noise-making mechanism including a vibratile noise-making element and a rotatable cam for actuating the same, and a motor geared to the wheels of the automobile and to the aforesaid friction wheel and cam.

6. A toy simulating a man holding and sighting a machine gun, said toy comprising two sheet metal sides oppositely convexed and secured together by appropriate connections, said sheet metal sides having a configuration simulating the man holding the machine gun in proper position, said sides fitting together in edge to edge relation to form a closed body except beneath the barrel and breech portions of the machine gun whereat the sides are left open in spaced relation, a friction wheel rotatably mounted at the open breech portion of the machine gun, and a flint engaging said wheel.

7. A toy simulating a man holding and sighting a machine gun, said toy comprising two sheet metal sides oppositely convexed and secured together, said sheet metal sides having a configuration simulating the man holding the machine gun in proper position, said sides fitting together in edge to edge relation to form a closed body except beneath the barrel and breech portions of the machine gun whereat the sides are left open in spaced relation, a friction wheel rotatably mounted at the open breech portion of the machine gun, a flint fixed at the trailing end of an elongated sheet metal holder the forward end of which is bent upwardly through a slot at the top of the machine gun simulation, said holder being freely movable in said slot and being removable through the open bottom of the gun for replacement.

8. A toy comprising a toy automobile the body of which is provided with a windshield opening and window openings, a simulated man holding and sighting a machine gun through the windshield opening, said simulation comprising two sides oppositely convexed and secured together, said sides having a configuration simulating the man holding the machine gun in proper position, the edges of said sides fitting together in edge to edge relation to form a closed body except beneath the barrel and breech portions of the machine gun whereat the sides are left open in spaced relation, a friction wheel rotatably mounted in the open breech portion of the machine gun and concealed thereby and by the automobile body, a flint engaging said wheel, and means gearing the wheels of the automobile to the aforesaid friction wheel.

9. A toy simulating a pursuit car used by police, Federal agents or the like, said toy comprising a toy automobile, the body of which is provided with a windshield opening and window openings, a simulated man holding and sighting a machine gun through the windshield opening, said simulation comprising two sheet metal sides oppositely convexed and secured together, said sides having a configuration simulating the man holding the machine gun in proper position, the edges of said sides fitting together in edge to edge relation to form a closed body except beneath the barrel and breech portions of the machine gun whereat the sides are left open in spaced relation, a friction wheel rotatably mounted in the open breech portion of the machine gun and concealed thereby and by the automobile body, a flint engaging said wheel, noise-making mechanism including a vibratile noise-making element and a rotatable cam for actuating the same, and means to drive the aforesaid friction wheel and cam.

10. A toy simulating a pursuit car used by police, Federal agents or the like, said toy comprising a toy automobile, the body of which is provided with a windshield opening and window openings, a simulated man holding and sighting a machine gun through the windshield opening, said simulation comprising two sheet metal sides oppositely convexed and secured together, said sides having a configuration simulating the man holding the machine gun in proper position, the edges of said sides fitting together in edge to edge relation to form a closed body except beneath the barrel and breech portions of the machine gun whereat the sides are left open in spaced relation, a friction wheel rotatably mounted in the open breech portion of the machine gun and concealed thereby and by the automobile body, a flint engaging said wheel, noise-making mechanism including a vibratile noise-making element and a rotatable cam for actuating the same, and a motor geared to the wheels of the vehicle and to the aforesaid friction wheel and cam.

11. A toy simulating a pursuit car used by police, Federal agents or the like, said toy comprising a toy automobile, the body of which is provided with a windshield opening and window openings, a simulated man holding and sighting a machine gun through the windshield opening, said simulation comprising two sheet metal sides oppositely convexed and secured together, said sides having a configuration simulating the man holding the machine gun in proper position, the edges of said sides fitting together in edge to edge relation to form a closed body except beneath the barrel and breech portions of the machine gun whereat the sides are left open in spaced relation, a friction wheel rotatably mounted in the open breech portion of the machine gun and concealed thereby and by the automobile body, a flint fixed at the trailing end of an elongated sheet metal holder the forward end of which is bent upwardly through a slot at the top of the machine gun simulation, said holder being freely movable in said slot and being removable through the open bottom of the gun for replacement, the flint and friction wheel being so disposed as to throw a shower of sparks forwardly at the open bottom portion of the gun simulation, and means to drive the friction wheel.

12. A toy simulating a pursuit car used by police, Federal agents or the like, said toy comprising a toy automobile, the body of which is provided with a windshield opening and window openings, a simulated man holding and sighting a machine gun through the windshield opening, said simulation comprising two sheet metal sides oppositely convexed and secured together, said sides having a configuration simulating the man holding the machine gun in proper position, the edges of said sides fitting together in edge to edge relation to form a closed body except beneath the barrel and breech portions of the machine gun whereat the sides are left open in spaced relation, a friction wheel rotatably mounted in the open breech portion of the machine gun and concealed thereby and by the automobile body, a flint fixed at the trailing end of an elongated sheet metal holder the forward end of which is bent upwardly through a slot at the top of the machine gun simulation, said holder being freely movable in said slot and being removable from the gun for replacement, the flint and friction wheel being so disposed as to throw a shower of sparks forwardly at the open bottom portion of the gun simulation, noise-making mechanism including a vibratile noise-making element and a rotatable cam for actuating the same, and a motor geared to the wheels of the automobile and to the aforesaid friction wheel and cam.

13. A toy comprising a wheeled vehicle having a body provided with an opening, a simulated gun the barrel of which projects through the opening, a friction wheel rotatably mounted inside the body of the vehicle near the opening, said wheel being disposed beneath the gun and being partially concealed by the gun and vehicle body, a flint mounted on said gun and so engaging said friction wheel as to throw a shower of sparks forwardly through the opening and toward the muzzle of the gun, and means gearing said wheel to the vehicle wheels.

14. A toy comprising a wheeled vehicle having a body provided with an opening, a small simulated gun the barrel of which projects through the opening, a simulated person riding said vehicle behind said gun, a friction wheel rotatably mounted inside the body of the vehicle near the opening, said wheel being disposed beneath the gun and being partially concealed by the gun and vehicle body, a flint mounted on the under side of said gun and so engaging said friction wheel as to throw a shower of sparks forwardly through the opening and beneath the gun, a motor for driving said vehicle, and means gearing said motor to said friction wheel and to the vehicle wheels.

15. A toy comprising a wheeled vehicle having a body provided with an opening, a simulated machine gun the barrel of which projects through the opening, a friction wheel rotatably mounted inside the body of the vehicle near the opening, said wheel being disposed beneath the gun and being partially concealed by the gun and vehicle body, a flint mounted on said gun and so engaging said friction wheel as to throw a shower of sparks forwardly through the opening and toward the muzzle of the gun, noise-making mechanism including a vibratile noise-making element and a rotatable cam for actuating the same, and a motor geared to the wheels of the vehicle and to the friction wheel and cam.

16. A toy vehicle the body of which is provided with an opening, a simulated gun the barrel of which projects through the opening, said gun being formed of sheet metal bent to inverted trough shape and open over a substantial part of the bottom thereof, the muzzle end being closed to simulate a gun tube but the breech end being open, a friction wheel rotatably mounted in the vehicle body beneath the open breech portion of the gun, said wheel being so disposed as to be substantially concealed by the parts of the vehicle body and gun, a flint carried by said gun and resting on said wheel, said flint being so disposed as to throw a shower of sparks forwardly through the opening and along the open bottom portion of the gun, and a motor geared to the wheels of the vehicle and to the friction wheel.

17. A vehicle toy comprising a vehicle body, wheels supporting said body, a spring motor housed in said body and geared to said wheels, said body having an opening, a simulated gun projecting through said opening, said gun being too small in dimension to itself carry sparking mechanism, and sparking mechanism for said gun including an abrasive wheel of substantial diameter located beneath the breech end of the gun and inside the vehicle body near the aforesaid opening, said gun being formed of sheet metal open at the breech of the gun for disposition over the abrasive wheel, a pyrophoric element carried by the gun and resting on the abrasive wheel in such position that a shower of sparks is thrown forwardly from the abrasive wheel through the opening and beneath the gun, and means gearing said abrasive wheel to the aforesaid driving motor and vehicle wheels.

18. A toy comprising a wheeled vehicle having a body, a simulated gun mounted thereon in such position as to be at least partially exposed outside the body of the vehicle and clearly visible on the vehicle, a friction wheel rotatably mounted in the body of the vehicle, said wheel being disposed beneath the gun and being partially concealed by the gun and vehicle body, a flint mounted on said gun and so engaging said friction wheel as to throw a visibly exposed shower of sparks forwardly in the same general direction that the gun points, in simulation of firing of the gun, and means gearing said wheel to a vehicle wheel.

19. A toy comprising a wheeled vehicle having a body, a small simulated gun mounted thereon in such position as to be at least partially exposed outside the body of the vehicle and clearly visible on the vehicle, a simulated person riding said vehicle behind said gun and simulatedly aiming the gun, a friction wheel rotatably mounted in the body of the vehicle, said wheel being disposed beneath the gun and being partially concealed by the gun and vehicle body, a flint mounted on the under side of said gun and so engaging said friction wheel as to throw a visibly exposed shower of sparks forwardly beneath the gun in the same general direction that the gun points, in simulation of firing of the gun, a motor for driving said vehicle, and means gearing said motor to said friction wheel and to a vehicle wheel.

LOUIS MARX.